Patented Dec. 1, 1953

2,661,304

UNITED STATES PATENT OFFICE 2,661,304

METHOD OF MANUFACTURING MOSAIC SCREENS FOR USE IN TELEVISION TRANSMITTING TUBES

Alfred Sommer, Iver, England, assignor to Electric & Musical Industries Limited, Hayes, England, a company of Great Britain No Drawing. Application July 24, 1948, Serial No. 40,628

Claims priority, application Great Britain August 9, 1947

3 Claims. (Cl. 117—33.2)

This invention relates to the manufacture of mosaic screens of the kind comprising discrete metallic elements, and suitable for use in television transmitting and like tubes.

One form of mosaic screen of this kind which is commonly employed comprises an insulating support of glass or mica provided on one surface with said discrete elements. Said elements can readily be formed of silver since a thin layer of silver deposited on the support can be caused to aggregate into minute discrete elements by heating, but it is often desirable to employ other metals, such as antimony, for forming said elements. However metals other than silver do not readily aggregate on heating, and therefore, when employing antimony, it has been proposed to form said elements by evaporating the antimony on to the support through the interstices of a mesh. This method introduces the disadvantage that the smallness of the elements is limited by the fineness of the pitch of mesh which can be obtained in practice and in general the element size in mosaic screens produced by this latter method is many times larger than in the case of silver elements produced by aggregation of a thin layer of silver.

The object of the present invention is to provide an improved method of manufacturing mosaic screens with a view to obtaining metallic elements of smaller size than hitherto obtained by evaporating a metal through a mesh.

According to the present invention there is provided a method of manufacturing a mosaic screen of the kind comprising discrete metallic elements and suitable for use in television transmitting and like tubes, wherein a layer of a compound of the metal to form said elements is provided on an insulating support, and said compound is thereafter reduced to said metal.

According to one form of the present invention there is provided a method of manufacturing a mosaic screen comprising discrete elements of antimony, and suitable for use in television transmitting and like tubes, wherein a layer of antimony trisulphide is provided on an insulating support and the antimony trisulphide is thereafter reduced by heating in hydrogen to antimony and hydrogen sulphide, the hydrogen sulphide being removed leaving a multiplicity of discrete elements of antimony on said insulating support.

The compound is preferably one which can readily be dispersed in colloidal solution so that said layer can be deposited by settling on to the support from a colloidal solution. The compound must also be such that reduction occurs at a temperature lower than the evaporation temperature of the metal.

In one example of the invention, applied to the manufacture of a mosaic screen comprising an insulating plate of glass or mica provided on one surface with a multiplicity of discrete metallic elements formed of antimony, the compound employed is antimony trisulphide ($Sb_2S_3$). This compound can be obtained in great purity and is easily suspended in water, and from such an aqueous suspension a thin layer of the compound is settled on to the insulating plate, the correct amount to be settled being determined by experiment. The insulating plate is then heated in hydrogen with the result that the layer of antimony trisulphide is reduced into the pure metal and hydrogen sulphide, the latter being removed leaving a multiplicity of discrete elements of the metal on the insulating plate. The mosaic screen so formed is subsequently introduced into, say, a television transmission tube, which is then evacuated, baked and the mosaic screen is activated with caesium by the method described in co-pending patent application No. 10,941 and now Patent No. 2,529,888.

The invention is applicable to mosaic screens such as employed in television transmission tubes of the kind known by the registered trade-mark "Emitron" wherein the optical image is projected on to the screen from the side thereof provided with the metallic elements, and application of the invention is also contemplated to transparent mosaic screens such as employed in television transmission tubes of the kind known by the registered trade-mark "Orthicon" wherein the optical image is projected onto the screen from the side opposite that provided with the metallic elements.

While the invention has been described applied to the manufacture of mosaic screens wherein the metallic elements are formed of antimony, said elements may be formed of other metals, for example, bismuth, and any other suitable compound other than the sulphide of the metal may be employed. Furthermore, the compound may be deposited on the insulating plate in other ways than by settling, for example, it may be possible to deposit it by spraying. It may also be possible to control the size of the metallic elements which are formed by varying the thickness of the layer of compound which is deposited.

What I claim is:

1. A method of manufacturing a mosaic screen of the kind comprising discrete metallic elements and suitable for use in a television transmission tube, comprising the steps of forming on an insulating support a thin layer in a solid state of antimony trisulphide in a quantity predetermined to produce a multiplicty of discrete elements of antimony upon reduction of the trisulphide, and thereafter heating said layer and exposing the heated layer to hydrogen to reduce the antimony trisulphide to a multiplicity of discrete elements of antimony.

2. A method of manufacturing a mosaic screen of the kind comprising discrete metallic elements and suitable for use in a television transmission tube, comprising the steps of forming an aqueous suspension of a sulphide of a metal selected from the group consisting of antimony and bismuth, settling the sulphide from said suspension on to an insulating support to form a thin layer of said sulphide in a quantity predetermined to produce a multiplicity of discrete elements of the metal upon reduction of the sulphide, and thereafter heating said layer and exposing the heated layer to hydrogen to reduce the sulphide to a multiplicity of discrete elements of the metal.

3. A method of manufacturing a mosaic screen of the kind comprising discrete metallic elements and suitable for use in a television transmission tube, comprising the steps of forming an aqueous suspension of antimony trisulphide, settling the trisulphide from said suspension on to an insulating support to form a thin layer of the trisulphide in a quantity predetermined to produce a multiplicity of discrete elements of antimony upon reduction of the trisulphide, and thereafter heating said layer and exposing the heated layer to hydrogen to reduce the trisulphide to a multiplicity of discrete elements of antimony.

ALFRED SOMMER.

References Cited in the file of this patent

UNITED STATES PATENTS

| Number | Name | Date |
|---|---|---|
| 1,987,683 | Hunt et al. | Jan. 15, 1935 |
| 2,062,858 | Batchelor | Dec. 1, 1936 |
| 2,130,215 | Young | Sept. 13, 1938 |
| 2,391,280 | Teal | Dec. 18, 1945 |